UNITED STATES PATENT OFFICE.

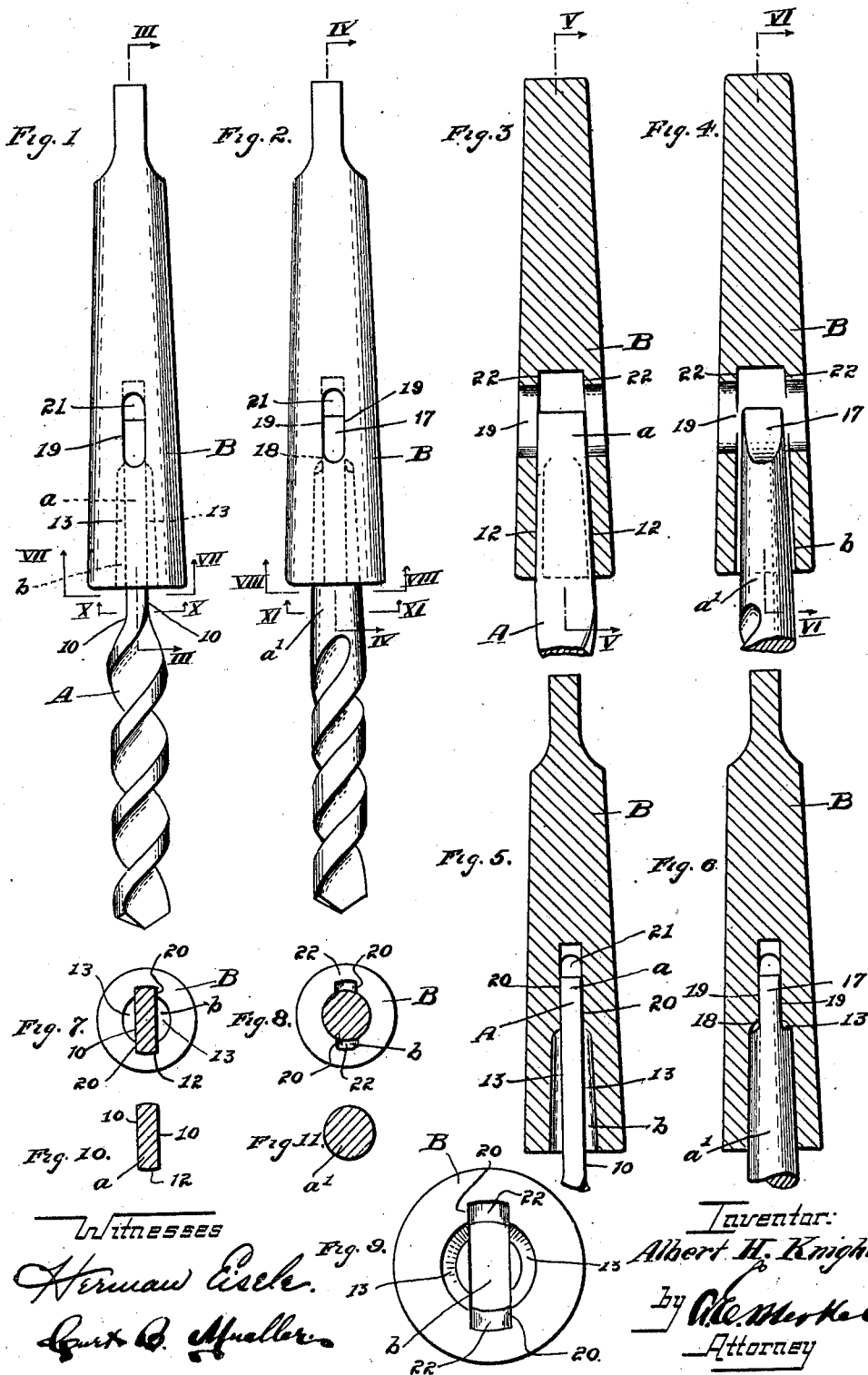

ALBERT H. KNIGHT, OF CLEVELAND, OHIO.

DRILL-HOLDER.

988,355. Specification of Letters Patent. Patented Apr. 4, 1911.

Application filed March 10, 1910. Serial No. 548,326.

*To all whom it may concern:*

Be it known that I, ALBERT H. KNIGHT, a citizen of the United States, resident of Cleveland, county of Cuyahoga, and State of Ohio, have invented a new and useful Improvement in Drill-Holders, of which the following is a specification, the principle of the invention being herein explained and the best mode in which I have contemplated applying that principle, so as to distinguish it from other inventions.

My invention relates to drill-holders and more particularly to such as will, in the form of an integral construction, prove adaptable for holding drills having either round or flat taper shanks.

The said invention is a specialized improvement upon the drill-holder shown, described and claimed in Patent #935,035 issued to me September 28, 1909, such an improvement consisting of means hereinafter fully described and particularly set forth in the claim.

The annexed drawings and the following description set forth in detail, certain mechanism embodying the invention, the disclosed means, however, constituting but one of various mechanical forms in which the principle of the invention may be applied.

In said annexed drawings; Figure 1 is a side view of a flat twist drill and drill socket embodying my invention. Fig. 2 is a view similar to Fig. 1 showing inserted, a drill having a round taper shank. Fig. 3 is a vertical section on line III—III in Fig. 1, looking in the direction indicated by the arrow. Fig. 4 is a view similar to Fig. 3 showing inserted, a round shank. Fig. 5 is a vertical section on line V—V of Fig. 3, looking in the direction indicated by the arrow. Fig. 6 is a view similar to Fig. 5, save that a round shank is shown as inserted therein. Fig. 7 is a horizontal section on line VII—VII of Fig. 1, looking upwardly. Fig. 8 is a similar view on line VIII—VIII of Fig. 2, looking upwardly. Fig. 9 is an enlarged inner end view of the drill socket. Fig. 10 is a cross-section of the flat shank. Fig. 11 is a cross-section of a round shank.

Like letters and numerals of reference refer to like parts throughout the several views.

Referring first to Fig. 1 of the drawing; a twist drill, which is composed of a spirally bent flat metal bar having an end-portion $a$ forming the shank of the drill, is indicated at A. The shank $a$ is flat, having its opposite sides 10 and 10 flat. These sides are gradually reduced in width toward the free extremity of the shank, so that the two longitudinal edges 12 and 12 thereof converge somewhat toward the said extremity of the shank, as shown in Fig. 3. The two edges 12 and 12 slope therefore toward each other in the direction of the free extremity of the shank. As will be obvious, these two edges may, if desirable, be similarly reduced in width toward the free extremity of the shank, to thereby make the sides 10 and 10 also converge. In Fig. 2 a drill having a round standardly tapered shank $a'$ is represented in similar relation to the socket, designated by the reference letter B.

My improved form of drill socket is provided in its inner end-portion and centrally with a bore $b$ for receiving the shanks $a$ and $a'$ of the drills. The bore $b$ extends from the inner extremity of the socket a suitable distance toward the outer end of the socket, and as shown, has two opposite side walls 20 and 20 which are flat, but which centrally thereof are cut away circumferentially of the axis of the socket, and specifically to form grooves 13 and 13 having a diminishing width and depth toward the inner end of the bore to form in turn portions of a conical surface, this feature being the one which, when placed in combination as hereinbefore and hereinafter described, forms the essence of this invention.

The walls 20 and 20 of the bore $b$ which likewise may or may not be made to converge are spaced laterally a distance enough greater than the distance between the sides 10 and 10 of the flat shank $a$ to render the latter loose at its sides relative to the drill socket and to facilitate the insertion of the said shank into the said bore. These walls 20 and 20 are preferably spaced laterally only the distance necessary to freely receive the flat shank $a$ sidewise between them, and consonantly the conical grooves 13 and 13 are spaced laterally only the distance necessary to freely receive the round taper shank $a'$ between them. The side walls 20 and 20 of the bore $b$ are gradually reduced in width from the inner end of the socket toward the inner end of the said bore and points on each wall, in any transverse plane, are arranged equidistantly from, but at opposite sides respectively of, the axis of the drill socket. The other and generally narrower side walls 22 and 22 of the bore *b* are arranged equidistantly from, but at opposite sides respectively of, the axis of the drill socket and converge from the inner end of the socket outwardly toward the outer end of the socket and, of course, are spaced far enough apart at the inner end of the socket to permit of the passage of the shank *a* into the bore a suitable distance. The two walls 22 and 22 slope, therefore, toward each other in the direction of the outer end of the drill socket, and the slope of the side walls 22 and 22 corresponds with the slope of the edges 12 and 12 of the shank *a*, so that the said shank upon being inserted into the drill socket will tightly fit the said wall at its said edges. It will accordingly be clear that, by the construction of my improved drill holder, I am enabled to insert therein with equal readiness, either drills made from a flat metal bar so as to have a flat shank, or a drill made from round stock so as to have a round shank. Further in both cases the shanks may be firmly held in the socket; the former due to the engagement of the side walls 20 and 20 with the flat sides of the shank, and the latter due to the engagement of the usual tang 17 with the innermost portion of the bore 18 and the sides 19 of the drift-slot 21. As will be readily understood, the insertion of a tool, not shown, will serve to engage the extremity of either shank to loosen it from the socket.

As indicative of the fact that the shape of my bore presents an interdependent double adaptability involving an identical inventive principle, it should be observed that passageways, which permit the free circulation of air through the holder, are left regardless of whether a round or flat taper shank has been inserted. The relative locations of these passageways are nicely and purposely disclosed in Figs. 8 and 7 respectively.

My improved drill holder is further readily and effectively adaptable for the reception of round shank drills whose tangs have been broken off. The shanks of such drills may be easily formed with either one, or two oppositely disposed key-seats, suitable, in turn, for the reception of keys, adapted to fit one or both of those ordinarily unoccupied passage-ways of the bore *b* between the inserted round shank, flat side walls 20 and narrower side walls 22. Accordingly, it will be evident that my integral holder serves for three distinct kinds of drills, which triple adaptability is moreover attained with a notably simple construction.

Having fully described my invention, what I claim therefore and desire to secure by Letters Patent is;

A drill-holder comprising a socket provided in its inner end-portion and centrally with a bore which extends from the inner extremity of the socket a suitable distance toward the outer end of the socket, which bore has two opposite laterally spaced side walls which are gradually reduced in width from the inner end of the socket toward the inner end of the bore, said bore having its other walls converging toward the inner end of the bore, the planes of two opposite sides of such bore being intersected by a conical surface.

Signed by me, this 9th day of March, 1910.

ALBERT H. KNIGHT.

Attested by—
 CURT B. MUELLER,
 S. W. KNIGHT.

---

Copies of this patent may be obtained for five cents each, by addressing the "Commissioner of Patents, Washington, D. C."